US010668623B2

United States Patent
Zhang et al.

(10) Patent No.: US 10,668,623 B2
(45) Date of Patent: Jun. 2, 2020

(54) METHOD AND SYSTEM FOR ROBOTIC ADAPTIVE PRODUCTION

(71) Applicants: ABB Schweiz AG, Baden (CH); Ford Motor Company, Dearborn, MI (US)

(72) Inventors: George Q. Zhang, Windsor, CT (US); David P. Gravel, Canton, MI (US); Soenke Kock, Schriesheim (DE); Thomas A. Fuhlbrigge, Ellington, CT (US); Heping Chen, Austin, TX (US); Sangeun Choi, Simsbury, CT (US); Arnold Bell, Brighton, MI (US); Biao Zhang, West Hartfod, CT (US)

(73) Assignees: ABB Schweiz AG, Baden (CH); Ford Motor Company, Dearborn, MI (US)

(*) Notice: Subject to any disclaimer, the term of this patent is extended or adjusted under 35 U.S.C. 154(b) by 69 days.

(21) Appl. No.: 15/169,517

(22) Filed: May 31, 2016

(65) Prior Publication Data
US 2016/0346928 A1 Dec. 1, 2016

Related U.S. Application Data

(60) Provisional application No. 62/167,933, filed on May 29, 2015.

(51) Int. Cl.
*B25J 9/16* (2006.01)
(52) U.S. Cl.
CPC ............ *B25J 9/1679* (2013.01); *Y10S 901/02* (2013.01); *Y10S 901/46* (2013.01); *Y10S 901/47* (2013.01)
(58) Field of Classification Search
CPC ..... B25J 9/1687; B25J 9/1679; Y10S 901/46; Y10S 901/47; Y10S 901/02
See application file for complete search history.

(56) References Cited

U.S. PATENT DOCUMENTS

| 5,289,634 A | * | 3/1994 | Makino | ................... | B23P 19/04 29/407.01 |
| 5,598,076 A | * | 1/1997 | Neubauer | ................ | B25J 9/161 318/568.13 |

(Continued)

FOREIGN PATENT DOCUMENTS

| WO | WO 2008/085937 | * | 7/2008 | ............ | B25J 9/1687 |
| WO | WO 2009/155946 | * | 12/2009 | ................ | B25J 9/16 |

OTHER PUBLICATIONS

International Search Report and Written Opinion, PCT/US16/35097, dated Sep. 1, 2016, 8 pages.

*Primary Examiner* — Rocio Del Mar Perez-Velez
*Assistant Examiner* — Olvin Lopez Alvarez
(74) *Attorney, Agent, or Firm* — Taft Stettinius & Hollister LLP; J. Bruce Schelkopf

(57) ABSTRACT

A method for robotic adaptive production includes modifying program instructions online while performing production activities in response to detecting a change in the production environment. A robotic adaptive production method includes modifying program instructions online while performing production activities to minimize a production task cycle time or improve a production task quality. A robotic adaptive production method includes estimating a relationship between a control parameter and a sensor input; and modifying the control parameter online to achieve an updated parameter based on the estimating. A robotic adaptive production method includes receiving sensor input relating to robotic performance during the performance of production tasks and online optimizing a process parameter based on robotic performance during the performance of the production tasks. A robotic adaptive production method includes determining the position and/or orientation of a (Continued)

feature based on a learned position and/or orientation of another feature and on a geometric relationship.

19 Claims, 4 Drawing Sheets

(56) References Cited

U.S. PATENT DOCUMENTS

| | | | |
|---|---|---|---|
| 5,943,660 A * | 8/1999 | Yesildirek | G06N 3/0454 |
| | | | 706/10 |
| 6,230,079 B1 * | 5/2001 | Brogårdh | B25J 9/1628 |
| | | | 700/260 |
| 6,463,360 B1 * | 10/2002 | Terada | B25J 9/1679 |
| | | | 318/568.12 |
| 6,522,952 B1 * | 2/2003 | Arai | B25J 9/1679 |
| | | | 414/591 |
| 6,526,373 B1 * | 2/2003 | Barral | B25J 9/1666 |
| | | | 700/245 |
| 6,553,652 B2 | 4/2003 | Sakakibara et al. | |
| 7,181,314 B2 * | 2/2007 | Zhang | B25J 9/1633 |
| | | | 414/754 |
| 9,008,836 B2 * | 4/2015 | Zhang | B25J 9/1687 |
| | | | 700/115 |
| 9,221,175 B2 * | 12/2015 | Iwasaki | B25J 9/1664 |
| 9,333,654 B2 | 5/2016 | Chen et al. | |
| 9,469,028 B2 * | 10/2016 | Sisbot | B25J 9/163 |
| 9,751,212 B1 * | 9/2017 | Martinson | B25J 9/163 |
| 2005/0240309 A1 | 10/2005 | Bischoff | |
| 2007/0244599 A1 * | 10/2007 | Tsai | B25J 9/1602 |
| | | | 700/245 |
| 2008/0312769 A1 * | 12/2008 | Sato | B25J 9/1633 |
| | | | 700/249 |
| 2010/0145509 A1 | 6/2010 | Zhang et al. | |
| 2010/0191374 A1 * | 7/2010 | Tsai | G05B 19/404 |
| | | | 700/258 |
| 2010/0204829 A1 | 8/2010 | Karlsson et al. | |
| 2011/0071675 A1 | 3/2011 | Wells et al. | |
| 2011/0153080 A1 * | 6/2011 | Shapiro | B25J 9/1666 |
| | | | 700/255 |
| 2012/0143371 A1 * | 6/2012 | Selnes | G05B 19/423 |
| | | | 700/254 |
| 2012/0182155 A1 * | 7/2012 | Sato | B25J 9/1674 |
| | | | 340/686.6 |
| 2012/0283875 A1 * | 11/2012 | Klumpp | B25J 9/1648 |
| | | | 700/258 |
| 2013/0030570 A1 * | 1/2013 | Shimizu | B25J 9/1679 |
| | | | 700/259 |
| 2013/0245828 A1 | 9/2013 | Tateno et al. | |
| 2013/0253702 A1 * | 9/2013 | Lecours | B25J 9/163 |
| | | | 700/250 |
| 2013/0261796 A1 | 10/2013 | Park | |
| 2013/0317646 A1 * | 11/2013 | Kimoto | B25J 9/1651 |
| | | | 700/250 |
| 2014/0052295 A1 | 2/2014 | Eakins et al. | |
| 2014/0154036 A1 * | 6/2014 | Mattern | B25J 9/1612 |
| | | | 414/729 |
| 2014/0309762 A1 * | 10/2014 | Hayata | B25J 9/1682 |
| | | | 700/114 |
| 2014/0316572 A1 * | 10/2014 | Iwatake | B25J 9/1633 |
| | | | 700/258 |
| 2015/0032252 A1 | 1/2015 | Galluzzo et al. | |
| 2015/0131896 A1 * | 5/2015 | Hu | G06K 9/00355 |
| | | | 382/153 |
| 2015/0258685 A1 * | 9/2015 | Matsumoto | B25J 9/1633 |
| | | | 700/261 |
| 2015/0283704 A1 * | 10/2015 | Watanabe | B25J 9/1612 |
| | | | 700/259 |
| 2016/0187874 A1 * | 6/2016 | Chen | G06Q 10/04 |
| | | | 700/96 |
| 2016/0229050 A1 * | 8/2016 | Wang | B25J 9/1689 |
| 2016/0271799 A1 * | 9/2016 | Sugio | B25J 9/1664 |
| 2016/0346926 A1 * | 12/2016 | Matthias | B25J 9/1676 |
| 2017/0203437 A1 * | 7/2017 | Passot | B25J 9/163 |

* cited by examiner

METHOD AND SYSTEM FOR ROBOTIC ADAPTIVE PRODUCTION

TECHNICAL FIELD

The present application relates generally to robotics and more particularly, but not exclusively, to robotic intelligence and adaptive manufacturing process automation.

BACKGROUND

Robotic production remains an area of interest. Some existing methods and systems have various shortcomings, drawbacks and disadvantages relative to certain applications. For example, in some robotic production methods and systems, the ability to modify the actions or performance of the robots based on production conditions or changes in production conditions may not be present or may be improved. Accordingly, there remains a need for further contributions in this area of technology.

SUMMARY

Embodiments of the present invention include unique methods and systems for robotic adaptive production. In one embodiment, program instructions are modified online while performing production activities during production in response to detecting a change in the production environment. In another embodiment, program instructions are modified online while performing production activities during production to minimize a production task cycle time or improve a production task quality. Another embodiment includes estimating a relationship between a control parameter and a sensor input; and modifying the control parameter online during production to achieve an updated parameter based on the estimating. Another embodiment includes receiving sensor input during the performance of production tasks, wherein the sensor input relates to robotic performance; and online optimizing a process parameter based on robotic performance during the performance of the production tasks. Another embodiment includes determining the position and/or orientation of the feature based on a learned position and/or orientation of another feature and on a geometric relationship between the features. Other embodiments include apparatuses, systems, devices, hardware, methods, and combinations for robotic adaptive production. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
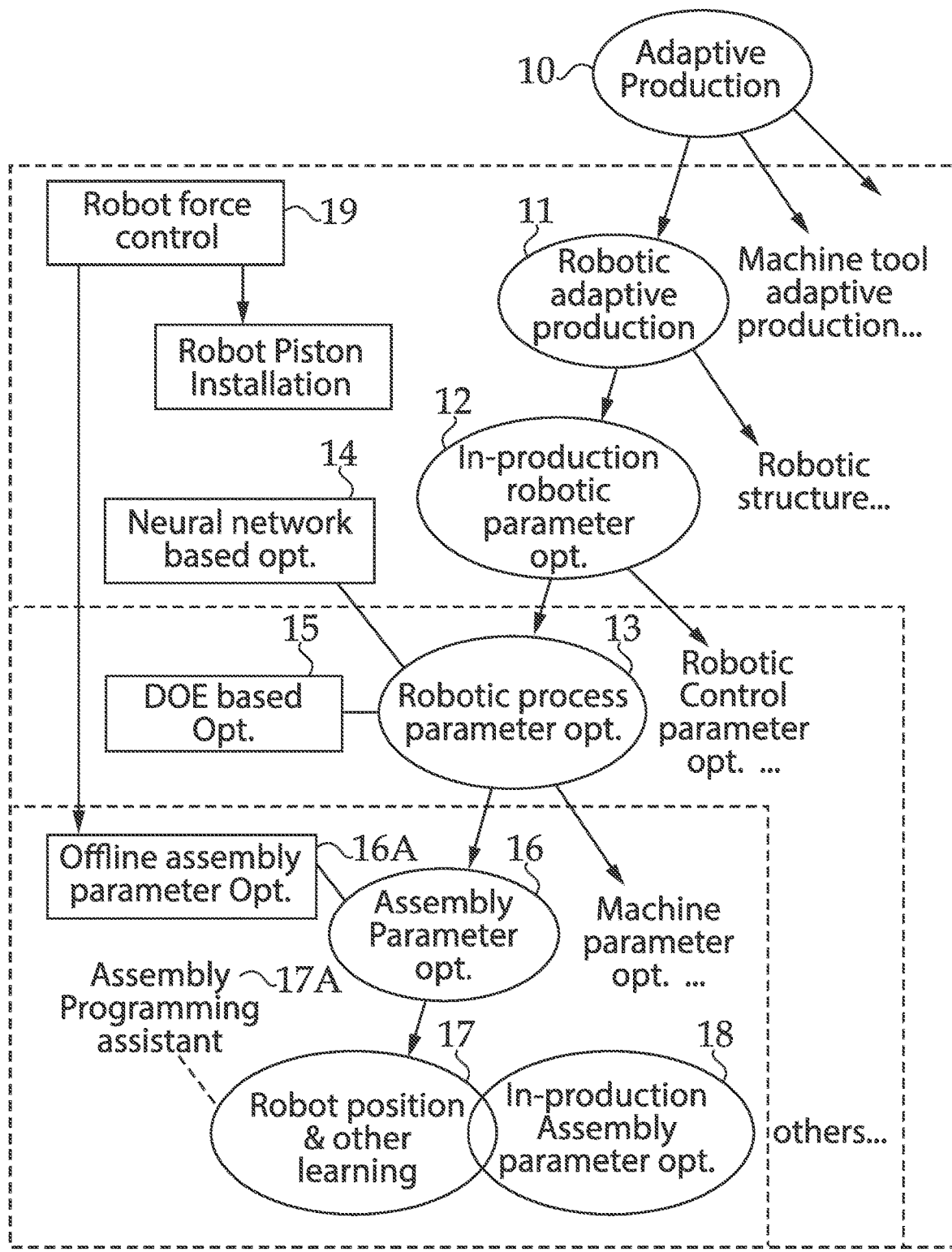
FIG. 1 diagrammatically depicts some aspects of non-limiting example of a structure for adaptive production (AP) in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Industrial robots with vision guidance, force control and other advanced control features are now more frequently used in industrial manufacturing applications. For example, U.S. Pat. Nos. 6,553,652 and 7,181,314, the disclosures of which are incorporated herein by reference, describe using an industrial robot with force control to perform tight-tolerance assembly tasks that cannot be performed by a conventional industrial robot that uses only position control. However, using force control, the actual robot path depends not only on the programmed position but also on the interaction force between the assembled parts/components; this makes the process of programming the robot more difficult. The optimal set of robotic (force control) parameters is often obtained either by trial and error or offline analysis tools. This parameter selection process can be tedious and time consuming.

U.S. Pat. No. 9,008,836, the disclosure of which is incorporated herein by reference, discloses a method and system for robotic assembly parameter optimization. In this method and system, a force controlled robotic assembly process is first categorized into different assembly types such as cylindrical, radial and multi-staged. Then each type of assembly is further parameterized into Search Force, Rotation Angle, Rotation Speed, Force Amplitude, Force Period, and so on.

U.S. Pub. No. 2011/0087360, the disclosure of which is incorporated herein by reference, describes moving line assembly applications that use an industrial robot with force control and visual servoing. A 2-D vision sensor is employed along with a 6-D force sensor to automatically perform a complex assembly on a moving production line. An assembly described therein includes mounting a wheel held by a robot onto the hub of a vehicle while the vehicle is moving on an assembly line. The vision sensor is first used to determine the orientation pattern of the hub. Then the robot rotates the wheel to the corresponding orientation before putting the wheel onto the wheel hub. During the approaching of the wheel to the moving hub, the vision servo tracks the movement of the hub in 2-D. Once the wheel contacts the hub, the force control effect dominates and the robot searches to match the holes on the wheel with the bolts on the hub while pushing the wheel into the assembled position.

U.S. Pub. No. 2010/0145509, the disclosure of which is incorporated herein by reference, describes using a robot to repeatedly assemble parts during a continuous production run of parts to be assembled. There are parameters of the robot that are used to assemble the parts. Simultaneously with the repeated assembly the robot parameters are optimized. The parts to be assembled have an assembly starting position and the simultaneous optimization of the robot assembly parameters also includes the learning of the starting position. The robot assembly parameters can be optimized in a predefined manner. The optimized parameters can then be verified and the optimized, and verified robot assembly parameters may then be used in place of the parameters of the robot associated with the parts assembly along with the learned starting position.

With some embodiments of the present invention, robot online (i.e., during production) learning and/or robot parameter optimization can be performed for all robotic automation processes, e.g., not only robotic assembly processes. Feedback sensors can be encoders, resolvers, force/torque sensors and vision cameras, and any other types of sensors that can give feedback about the production condition variations during a manufacturing process.

Embodiments of the present invention include methods and systems to conduct robotic adaptive production in manufacturing automation, including (1) methods and systems to modify the robot program such as the position and program execution sequence; (2) methods and systems to automatically tune the servo controller parameters such as control gains and damping factors in force control; (3) methods and systems to optimize the manufacturing process parameters such as contact force, rotation angle and speed; (4) methods and systems to regain or adjust the program positions such as retouching the program points through user-guided motion under force control mode; (5) methods and systems to learn robot and/or part positions during production based on the relationship between features.

Referring to FIG. 1 some aspects of non-limiting example of a structure for adaptive production (AP) 10 in accordance with an embodiment of the present invention is diagrammatically depicted. AP 10 includes a plurality of subsets, including robotic adaptive production (RAP) 11 and machine tool adaptive production.

RAP 11 has, as shown in FIG. 1, several subsets, one of which, "In-production robotic parameter optimization" (IRPO) 12, relates to one or more methods and systems described herein. IRPO 12 includes two subsets, one of which, "Robotic process parameter optimization" (RPPO) 13, relates to one or more methods and systems described herein. Either or both of the well-known neural network based optimization 14 or the design of experiments (DOE) based optimization 15 can be used for RPPO 13.

The next level down from RPPO 13 is Assembly parameter optimization (APO) 16, using input from a force sensor 19 to "Offline assembly parameter optimization" (APO) 16A. APO 16 leads to "Robot position and other learning" (RPOL) 17, "In-production Assembly parameter optimization" 18 and "others". RPOL 17 has a dashed line input from "Assembly Programming assistant" (APA) 17A.

1) Embodiments of the present invention include methods and systems to modify the robot program such as position and program execution sequence based on sensor input. Some non-limiting examples follow.

Traditionally a robot is a programmable machine that does what it is pre-programmed to do. If it cannot perform what has been programmed, the robot will either stop the process and its motion or end up in a fault state. The intelligent industrial robot system disclosed herein can modify its behavior including the program position and program execution sequence.

For example, in a human robot collaboration assembly line, the configuration of the assembly line can be changed during the production, such as adding or removing a human worker, robot worker or equipment (e.g., such as a part feeder). The existing robots on the assembly line can use the sensors on their own arms/bodies or on other robots' arms/bodies to detect the changes. Then the robot motion can be modified automatically to avoid collisions, minimize the cycle time and enable human robot interactive tasks, e.g., such as the robot handing over the assembled component to human worker/part feeder and vice versa.

Figure 2:
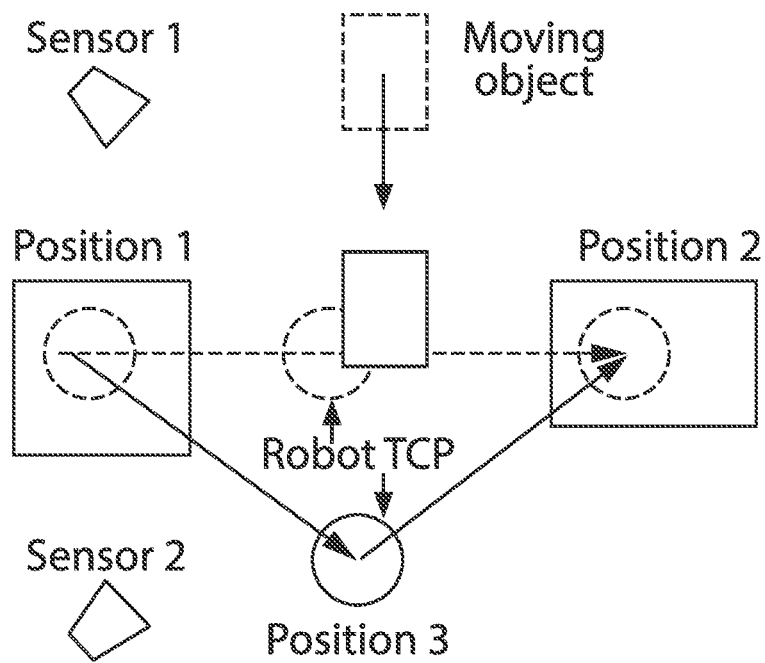
FIG. 2 schematically depicts some aspects of a non-limiting example of a robot moving a tool center point (TCP) in order to avoid contact with a moving object in accordance with an embodiment of the present invention.

Another example is the robot altering the path followed by its TCP based on its sensing input. For example, as illustrated in FIG. 2, the robot TCP is normally programmed to follow a direct path from Position 1 to Position 2. When one or more sensors, such as sensor 1 and/or sensor 2 shown in FIG. 2, detect that there is an object moving into the working area that may come into contact with the TCP or another portion of the robot if the robot TCP were to follow the path it usually follows, then the robot will alternate the TCP path, e.g., in a predetermined manner, e.g., from Position 1 to Position 3 and then to Position 2, to thereby avoid coming into contact with the moving object. Sensors 1 and 2 may be any suitable sensor, e.g., cameras or other presence detection sensors such as laser detectors, acoustic sensors or one or more of various types of proximity sensors. Another example that depends on the type of robot arm is the robot's tool center point (TCP) path remaining unchanged but some of the joints in the arm changing their angle in a predetermined manner to avoid having the robot arm come into contact with an object moving into the working area.

Another example is that when a robot with this kind of intelligence, that is adaptive manufacturing, is performing assembly tasks in its force control mode, it will sense its assembly final position each time. Based on the relationship between the starting and final assembly positions, the start position may be modified to achieve shorter assembly cycle time or better assembly quality.

The robot also can sense the contact force and torque in the course of the assembly and determine if parts being assembled are the correct parts, and if not, modify the assembly process. For example, when a valve is inserted by a robot into a valve body on top of a spring, if the spring is wrong, the different spring constant will affect the contact force during assembly. When the robot senses the different contact force, it changes the program execution sequence, stops the insertion, moves the valve body to a repair station, and performs the assembly on the next valve body. The quality of assembly may be defined by lower contact force and other related indicators, e.g., such as assembly cycle time and success rate.

2) Embodiments of the present invention include methods and systems to automatically tune the control parameters such as control gains and damping factors during production. Some non-limiting examples follow.

Tuning the robotic system control parameters online during production is a desirable feature of intelligent robotics used in manufacturing automation so as to be able to consistently achieve better performance. Based on the sensing input and establishing the relationship between the control parameters and the performance of the robots, control parameters will be tuned by use of one or more of a variety of methodologies such as design of experiments (DOE), genetic algorithm and/or model based algorithms.

Figure 3:
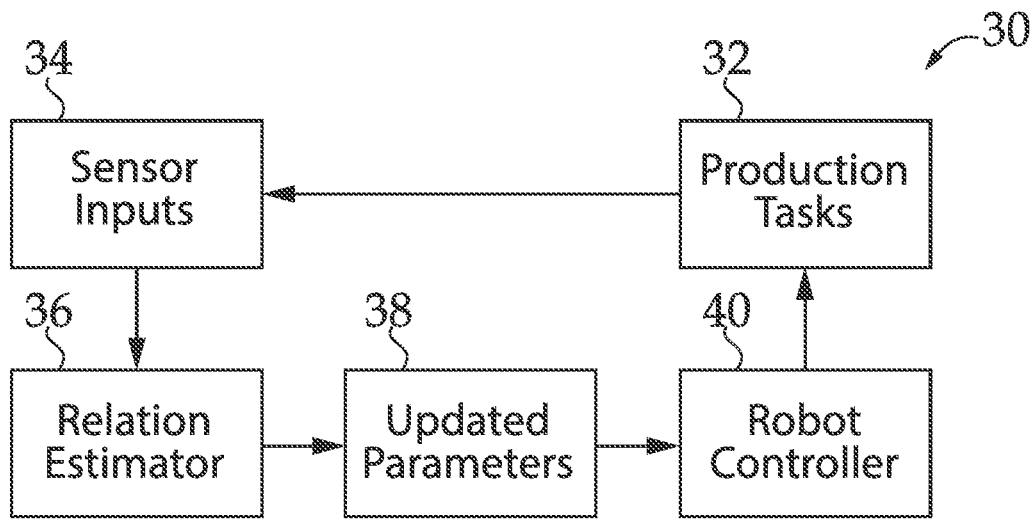
FIG. 3 depicts some aspects of a non-limiting example of an automatic tune task flow diagram in accordance with an embodiment of the present invention.

Referring to FIG. 3, some aspects of a non-limiting example of a block diagram 30 for automatic tuning tasks in robotic manufacturing production in accordance with an embodiment of the present invention is illustrated. During the performance of production activities or production tasks 32, inputs 34 from one or more sensors, e.g., such as a force sensor which can measure the contact force along X, Y, Z axis direction and torque about the X, Y, Z axis, or one or more accelerometers, are brought in to a relation estimator 36 for parameters and their corresponding performance indicators of the robotic automation system. For example, the less the damping, the faster the robot moves to respond to the sensed force and torque. However, the robot system can become unstable if the robot response frequency is close to the robot system's natural frequency or if the robot is too sensitive to noise from the force sensor or accelerometer(s). This is the same as the known gains in PID control for a robot system. The relation estimator can use the measured quantities, e.g., contact force and torque along with the robot measured dynamic performance (e.g., such as speed, acceleration) along with the current values of gains and damping to estimate the relationship between them. Then the relation estimator can predict the better gains and damping to improve the robot dynamic performance and maintain the stability of the robot system and limit the maximum contact force and torques.

The output of the relation estimator is used to calculate a set of updated parameters 38 which are sent to a robotic control system having one or more controllers, e.g., controller 40. These parameters can be calculated in a control system, e.g., such as the robot controller, a robot teach pendant, a separate computer and/or computation in the cloud, which may provide more computation power and memory. The control system, e.g., the robot controller 40 uses this set of parameters to cause the robot to perform manufacturing production tasks 32. The resulting performance is sensed by the sensors of various types including product quality measurement means. The sensor inputs 34 are taken again by the relation estimator 36 to perform another round of parameter tuning until the optimal parameter set is obtained. For example, in a torque converter assembly, the robot needs to rotate the torque converter around the Z axis in order to mate two pump gear teeth with a gear inside the transmission housing. The damping for rotation around the Z axis can be estimated based the measured torque around the Z axis and the angular velocity and acceleration around the Z axis. The criteria used to determine when the optimal parameter set has been obtained depends on the type of task to be performed by the robot. The computation device, which runs the relation estimator 36, can determine when the optimal parameter set has been achieved. The relation estimator does three functions: (1) based on the inputs (measured force, torque, speed and acceleration), to estimate the relationship (model) between them; (2) based on the relationship (model), to estimate (predict) the parameter set, which can improve the performance of the system (such as assembly cycle time and assembly successful rate); and (3) to check if the performance of the system is improved. If not, an optimal parameter set has been found. For example, in an assembly application the criteria could be assembly cycle time and success rate.

An example of the auto tune in robotic assembly is tuning of the force control damping factoring in-production. The tuning of the damping factor can dramatically improve the robotic assembly performance, e.g., in the torque converter assembly described above.

3) Embodiments of the present invention include methods and systems to optimize the manufacturing process parameters, e.g., such as contact force, rotation angle and rotation speed. Some non-limiting examples follow.

With robot force control, the industrial robot programming is no longer only related to robot motion itself but combined with production process parameters. The manufacturing related parameters become part of the robot program, which increases the complexity of the robot programming process. The manufacturing related parameters are preferably optimized in production environment. As described above, U.S. Pat. No. 9,008,836 discloses a method and system for robotic assembly parameter optimization, and U.S. Pub. No. 2010/0145509 discloses a method and systems for in-production optimization of the parameters of a robot used for assembly.

Figure 4:
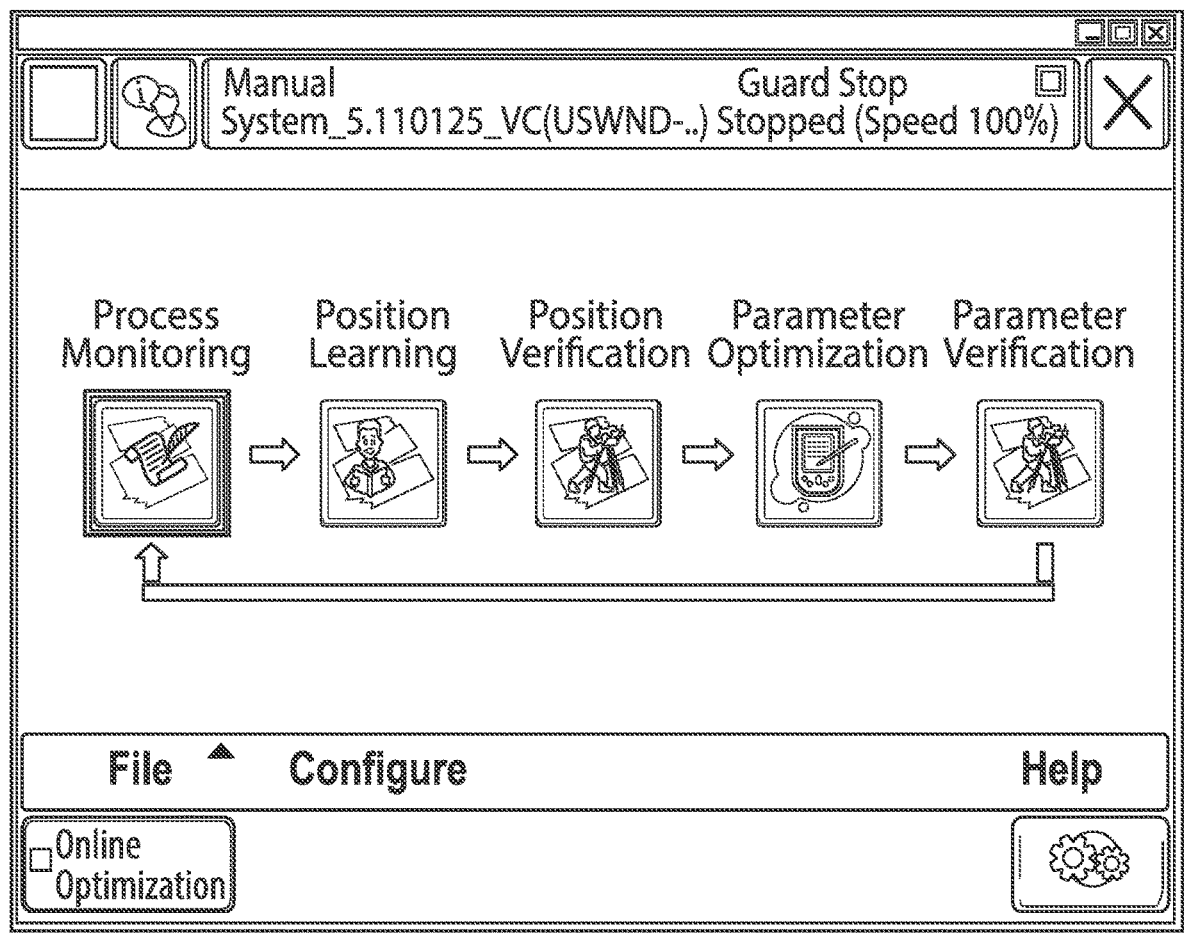
FIG. 4 illustrates some aspects of a non-limiting example of a snapshot of a user interface of an in-production parameter optimization tool.

FIG. 4 illustrates some aspects of a non-limiting example of a user interface snapshot of an in-production parameter optimization tool.

With some embodiments of the present invention, the parameter optimization is expanded beyond the assembly application to all robotic production processes. Algorithms used in the robotic assembly parameter optimization and position learning can be also used in broader robotic production applications.

4) Embodiments of the present invention include methods and systems to regain or adjust the program positions in a production environment. Some non-limiting examples follow.

In robotic automated manufacturing, batch and supplier changes, collisions or other unexpected robot motions, and in some cases a production line shutdown, may cause variations of the position of the part, fixture or the dimension of tool as well as the programmed robot positions and parameters. To avoid the influences caused by the above described manufacturing conditions and to maintain the robotic automation system at its optimal status during the production, a method and algorithm is developed to deal with this issue. In a robotic assembly process with a force controlled robot, as an example, a re-adjusting program is used to go through all the taught positions in a manual mode. User-guided robot motion may be used to adjust the robot to its proper positions and re-touching the points. For example, in valve body assembly, due to a collision or fixture position changes, the start assembly position of the valve, which is held by the robot, is off from the right position and orientation relative to the valve body. The operator can launch a graphic user interface (GUI) operating on a control system, e.g., a robot teach pendant or another computer or controller. The GUI can instruct the operator to enable a lead through teaching model under force control. Then the operator can drag (guide) the robot to either touch the proper start position or insert the valve into the valve body manually. After the valve is successfully inserted into the valve body, the robot program can then automatically calculate the proper position and orientation of the valve start position based on the final insertion position in the valve body.

5) Embodiments of the present invention include methods and systems to learn robot parameters during production based on the relationship among the features. Some non-limiting examples follow.

Figure 5:
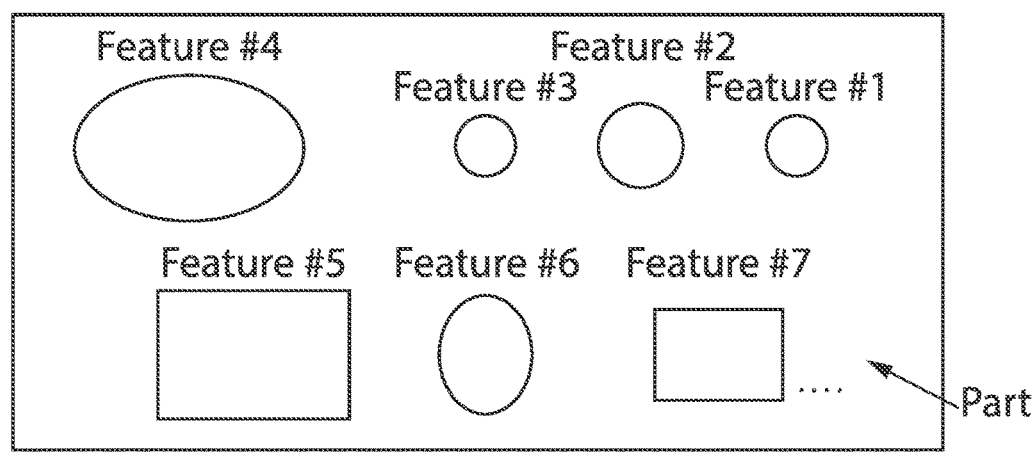
FIG. 5 illustrates some aspects of a non-limiting example of a part having a plurality of features employed in describing an embodiment of the present invention.

In modern robotic automation, the part that is dealt with could be very complex and have several features, e.g., holes, on it. The relationship between the features can be used to efficiently learn the robot and/or part positions or other process parameters. Referring to FIG. 5, a part with seven assembling hole-type features identified as features 1 to 7 is illustrated. The relationship among those features is known and fairly accurate based on the design of the part. When the robot is performing certain manufacturing tasks, e.g., for some or all of the features, robot learning methodology such as that described above can be used to obtain the tasks to be performed for a few of the hole features. The relationship between those few features and the rest of the features can then be used to improve the position and other parameters used in performing the manufacturing tasks to the remainder of the features. Thus the robot will perform better on the tasks for the rest of the features because of the improvement in the position and the parameters as described above on the same part.

Figure 6:
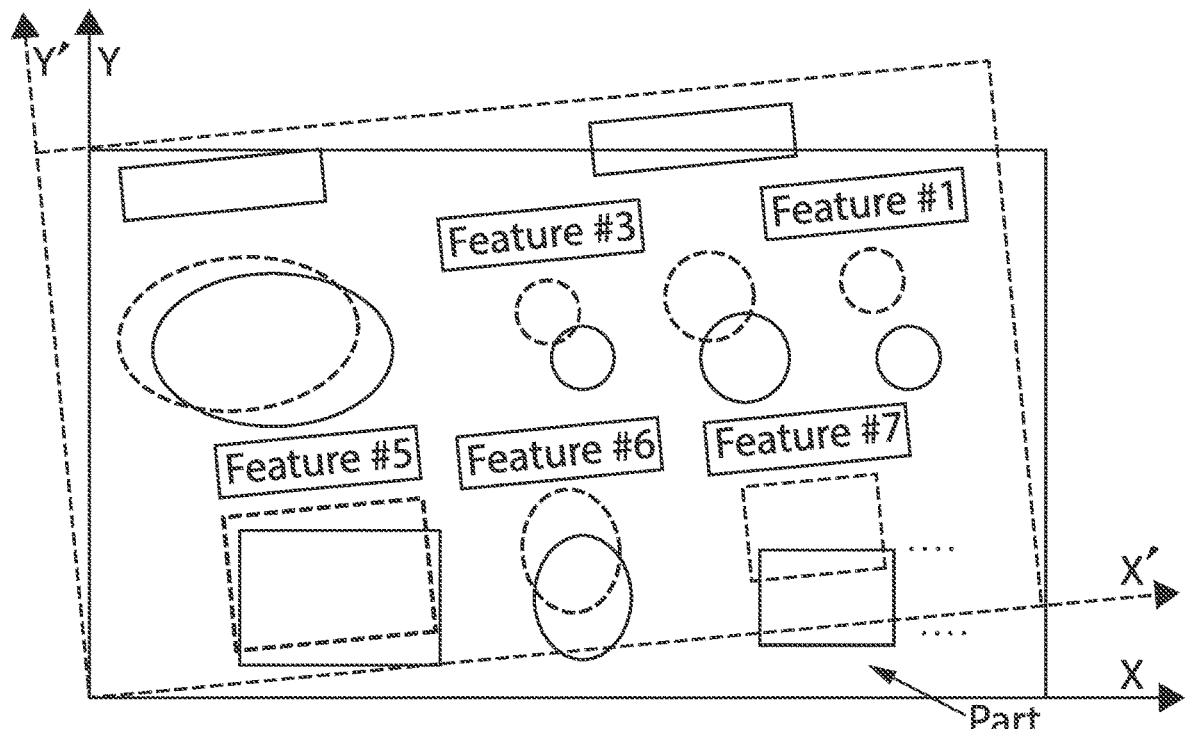
FIG. 6 illustrates some aspects of a non-limiting example of the part of FIG. 5 rotated about the origin of the X-Y axis employed in describing an embodiment of the present invention.

As shown in FIG. 5 a part to be assembled may have different features that have relationships to each other. The part position learned from one feature or a combination of features can be applied to the other features. An example of this is shown in FIG. 6. As shown therein, the part's original position (including orientation) is at XY. Position learning is performed when for example feature #5 is assembled. Based on the learning result, the "new" part position can be estimated as X'Y' and the positions of all of the features can be represented as shown by the dashed lines based on the relationships between the features and the part. From then on, the new feature positions can be used in the searching/ assembling (or other processing, such as machining) for each of the other features. During the assembly of the next feature, for example feature #4, the new part and features' positions can be re-estimated, and so on. In this way, more accurate starting positions can be obtained for assembling a part with multiple features.

Figure 7:
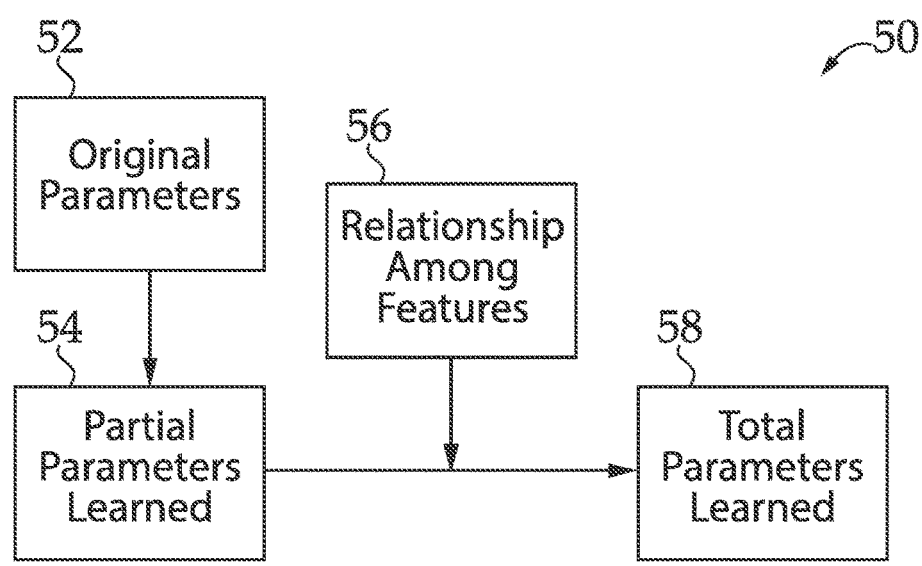
FIG. 7 illustrates some aspects of a non-limiting example of a learning process in accordance with an embodiment of the present invention.

FIG. 7 shows a diagram 50 of the partial learning scheme described above. For a set of robotic production parameters, the intelligent robot system starts out with the original parameters 52, learns the parameters partially during production and then uses the relationship among the features 56 to calculate the rest of parameters 58 (during production). An example of the partial learning is to modify the starting positions in a force controlled robotic assembly process based on their end positions. For example, assuming there are 5 features on an assembled part, after assembling with the first two features, the assembly end positions are used to modify the starting positions including orientations for the remaining three features because the relationship between the features, e.g., holes, is known, e.g., with the position and orientation of the starting position learned from assembly of/with the first two features and with knowledge of the geometric relationship between or among the 5 features extracted from a computer aided design (CAD) model of the part, the robot controller or other computer can determine the starting positions of the remaining three features, thus completing the learning process. There may be a verification process in some embodiments. The starting position of an extra one or more features can be learned from the feature assembly process to verify the calculated starting positions based on the assembly with two features in combination with the geometric relationship among the 5 features, and the assembly end positions can be used to modify the starting positions including orientations for the remaining three features because the relationship between the features, e.g., holes, is known. Thus, using the first two learned starting positions and the geometry of the part, the part location and orientation can be obtained for the remaining three features. Further, the starting positions for those features can be calculated. This algorithm has been tested using a multiple-feature valve body assembly as the part.

As can be appreciated in responding to the manufacturing environment the adaptive production system can use one or all or any combination of the methods described above and is not limited only to those methods. The methods that are used may vary with the circumstances.

As can be further appreciated, the robotic adaptive production system described herein is not limited to assembly applications, but rather can be used for any applications and production tasks in addition to production assembly tasks in which process parameters such as contact force, rotation angles, speed or other parameters make a difference.

Embodiments of the present invention include automatically modifying the robot program such as position and program execution sequence to avoid stopping the process and motion or end up in a fault state after the manufacturing environment changes.

Some embodiments of the present invention may promote achieving better performance of assembly or other manufacturing processes by automatically tuning the servo controller parameters such as control gains and damping factors in force control as well as the manufacturing process parameters such as contact force, rotation angle and speed.

Some embodiments of the present invention include regaining or adjust the program positions such as retouching the program points through user-guided motion under force control mode.

Some embodiments of the present invention may promote quick adjustment of the robot production parameters based on partially learning robot positions during the production, and based on knowledge of the relationship between features.

Embodiments of the present invention include a method and system for robotic adaptive production using an industrial robot with a controller. A second computing device such as a teach pendant with a microprocessor or a separate PC that communicates with the robot controller is used as a data collecting and processing means, or the controller by itself can be used as a data collecting and processing means if it has the ability to perform those functions. Various sensors that quantify variation of the production conditions could be used as feedback devices. When the robotic adaptive production system is used or enabled, the system responds to the manufacturing environment changes such as changes of position and orientation of a part, fixture or robot; changes of properties of the part (e.g., weight, spring constant, etc.); and changes of the presence of the part.

Embodiments of the present invention include a method for robotic adaptive production with at least one robot, comprising: providing a control system with first program instructions operative to direct robotic performance of production activities in a production environment; providing the control system with second program instructions operative to detect a change in the production environment using a sensor, and to modify execution of the first program instructions in response to the change; operating the robot to perform the production activities during production using the first program instructions; detecting a change in the production environment using the second program instructions with input from the sensor; and the second program instructions modifying the first program instructions online to accommodate the change in the production environment while performing the production activities during production in response to detecting the change.

In a refinement, the second program instructions modify the first program instructions to enable human-robot interactive tasks.

In another refinement, the second program instructions modify the first program instructions to avoid a collision.

In yet another refinement, the production environment includes a production line, and the change in the production environment is a change in a configuration of a production line.

In still another refinement, the second program instructions modify the first program instructions to direct the robot to hand over a component to a human worker and/or a part feeder.

In yet still another refinement, the second program instructions modify the first program instructions to direct the robot to receive a component from a human worker and/or a part feeder.

In yet still another refinement, the change in configuration is the addition or removal of a human worker, a robot worker and/or production equipment.

In a further refinement, the change in environment is an object moving into a robotic working area; the first program instructions are configured to direct a robot tool center point (TCP) to move in a direct path from a first position to a second position; and, in response to detecting the object moving into the robotic working area, the second program instructions modify the first program instructions to direct the TCP to move from the first position to a third position to avoid a collision with the object, and then to move the TCP from the third position to the second position.

In a further refinement, the change in environment is an object moving into a robotic working area; the first program instructions are configured to direct a robot tool center point (TCP) to move in a direct path from a first position to a second position; and, in response to detecting the object moving into the robotic working area, the second program instructions modify the first program instructions to direct the TCP to move from the first position directly to the second position while changing the angle of a joint in a robot arm to avoid a collision with the object.

In a yet further refinement, the first program instructions are configured to direct the robot to assemble a part; the change in production environment is the introduction of an incorrect part for an assembly; and, in response to detecting that a part is the incorrect part for the assembly, the second program instructions modify the first program instructions to direct the robot to set the incorrect part aside.

In a still further refinement, the second program instructions are configured to detect the introduction of the incorrect part based on a sensed contact force and/or a sensed torque.

In a yet still further refinement, the second program instructions are configured to detect the introduction of the incorrect part based on a spring constant of the incorrect part.

Embodiments of the present invention include a method for robotic adaptive production with at least one robot, comprising: providing a control system with first program instructions operative to direct robotic performance of production tasks in a production environment; providing the control system with second program instructions operative to modify the first program instructions; operating the robot to perform the production tasks during production using the first program instructions; and the second program instructions modifying the first program instructions online during production to minimize a production task cycle time or improve a production task quality.

In a refinement, the method further comprises sensing a robot final position after the performance of a production task, wherein, based on a relationship between a robot start position and the sensed robot final position, the second program instructions modify the first program instructions to modify the start position to achieve a shorter production task cycle time.

Embodiments of the present invention include a method for robotic adaptive production with at least one robot, comprising: providing a control system with first program instructions operative to direct robotic performance of production tasks in a production environment based on a control parameter; providing the control system with second program instructions operative to modify the control parameter; operating the robot to perform the production tasks during production using the first program instructions; receiving sensor input from at least one sensor during the performance of the production tasks, wherein the sensor input relates to robotic performance; estimating a relationship between the control parameter and the sensor input; modifying the control parameter online during production to achieve an updated parameter based on the estimating; and operating the robot to perform the production tasks during production using the updated parameter.

In a refinement, the method further comprises determining whether robotic performance has improved based on using the updated parameter.

In another refinement, the robotic performance is measured in terms of assembly cycle time and/or assembly success rate.

In yet another refinement, the control parameter is gain and/or damping.

In still another refinement, the sensor input is measured force, torque, speed and/or acceleration.

In yet still another refinement, the estimating and/or modifying are based on design of experiments, a genetic algorithm and/or a model based algorithm.

Embodiments of the present invention include a method for robotic adaptive production with at least one robot, comprising: providing a control system with first program instructions operative to direct robotic performance of production tasks in a production environment based on a process parameter; providing the control system with second program instructions operative to modify the process parameter; operating the robot to perform the production tasks during production using the first program instructions; receiving sensor input from at least one sensor during the performance of the production tasks, wherein the sensor input relates to robotic performance; online optimizing the process parameter based on robotic performance while performing the production tasks; and operating the robot to perform the production tasks during production using the optimized parameter.

In a refinement, the process parameter is contact force, rotation angle and/or rotation speed.

Embodiments of the present invention include a method for robotic adaptive production with at least one robot, comprising: providing a control system with program instructions operative to direct robotic performance of production tasks on a part in a production environment, wherein the part includes a plurality of features having a geometric relationship therebetween, the program instructions including parameters relating to an expected position and/or orientation of the plurality of features and being configured to access data defining the geometric relationship; executing the program instructions to direct a robot to perform a production task on at least one of the features; executing the program instructions online during production to learn an actual position and/or orientation of the at least one of the features as part of the performing of the production task; executing the program instructions online during production to learn a position and/or orientation of at least another of the features by determining the position and/or orientation of the at least another of the features based on the learned position and/or orientation of the at least one of the features and on the geometric relationship; and executing the program instructions to direct the robot to perform a production task on the at least another of the features using the learned position and/or orientation of the at least another of the features.

In a refinement, the method further comprises executing the program instructions online during production to determine whether the actual position and/or orientation of the at least one of the features is different than the expected position and/or orientation of the at least one of the features, wherein the executing of the program instructions online during production to learn the actual position and/or an orientation of the at least another of the features is performed in response to determining that the actual position and/or orientation of the at least one of the features is different than the expected position and/or orientation of the at least one of the features.

In another refinement, the at least one of the features is at least two of the features of the plurality of features, and the at least another of the features is at least a third feature of the plurality of features.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for robotic adaptive production with at least one robot, comprising:
    providing a control system with first program instructions operative to direct robotic performance of production tasks in a production environment based on control parameters;
    providing the control system with second program instructions operative to modify the control parameters;
    operating the robot to perform the production tasks during production using the first program instructions;
    receiving sensor input from at least one sensor during the performance of the production tasks, wherein the sensor input relates to robotic performance, wherein the sensor input includes measured force, torque, speed and acceleration;
    estimating a relationship between the measured force, the torque, the speed and the acceleration; and based on the relationship, estimating the control parameters to improve assembly cycle time and assembly success rate, wherein the control parameters include gain and damping in force control;
    modifying the control parameters online during production to achieve updated control parameters based on the estimating, using the second program instructions;
    determining whether robotic performance has improved based on using the updated control parameters; and
    operating the robot to perform the production tasks during production using the updated control parameters;
    wherein the estimating and the modifying are based on a genetic algorithm.

2. The method of claim 1,
    wherein the second program instructions provided with the control system are further operative to detect a change in the production environment using the at least one sensor, and wherein the method further includes
    detecting a change in the production environment using the second program instructions with input from the at least one sensor.

3. The method of claim 2,
    wherein the first program instructions are configured to direct the robot to assemble a part,
    wherein the change in production environment is an introduction of an incorrect part for an assembly, and
    wherein, in response to detecting that a part is the incorrect part for the assembly, the second program instructions modify the first program instructions to direct the robot to set the incorrect part aside.

4. The method of claim 3, wherein the assembly is a valve, and wherein the part is a spring for the valve.

5. The method of claim 3, wherein the detecting step comprises detecting the introduction of the incorrect part based on a sensed contact force and/or a sensed torque.

6. The method of claim 3, wherein the detecting step comprises detecting the introduction of the incorrect part based on a spring constant of the incorrect part.

7. The method of claim 2, wherein the production environment includes a production line, and wherein the step of detecting the change in the production environment includes detecting a change in a configuration of the production line.

8. The method of claim 7, wherein the step of detecting the change further comprises detecting an addition or removal of a human worker, a robot worker, and/or production equipment.

9. The method of claim 2,
    wherein the step of detecting the change in the production environment includes detecting an object moving into a robotic working area,
    wherein the first program instructions provided with the control system are further operative to direct a robot tool center point (TCP) to move in a direct path from a first position to a second position, and
    wherein the modifying step further includes, in response to detecting the object moving into the robotic working area, the second program instructions modifying the first program instructions to direct the TCP to move from the first position to a third position to avoid a collision with the object, and then to move the TCP from the third position to the second position.

10. The method of claim 2, wherein the step of detecting the change in environment includes detecting an object moving into a robotic working area, and wherein the method further includes:

directing, by the first program instructions, a robot tool center point (TCP) to move in a direct path from a first position to a second position; and modifying, by the second program instructions and in response to detecting the object moving into the robotic working area, the first program instructions to direct the TCP to move from the first position directly to the second position while changing an angle of a joint in a robot arm to avoid a collision with the object.

11. The method of claim 1,
wherein the first program instructions provided with the control system are further operative to direct robotic performance of production tasks in a production environment using a plurality of process parameters, wherein the process parameters include contact force, rotation angle and rotation speed.

12. The method of claim 11, further including the steps of:
online optimizing the process parameters using a neural network based optimization and the second program instructions, and based on robotic performance while performing the production tasks; and
operating the robot to perform the production tasks during production using the optimized process parameters.

13. The method of claim 1,
wherein the first program instructions provided with the control system are further operative to direct robotic performance of production tasks on a part in a production environment, the part having a plurality of features having a geometric relationship therebetween, wherein the features are at least one rectangle, circle, and other geometric features, the first program instructions including parameters relating to an expected position and/or orientation of the plurality of features and being configured to access data defining the geometric relationship,
wherein the step of operating includes executing the first program instructions to direct the robot to perform a production task on at least one of the features,
wherein the step of modifying includes:
executing the second program instructions online during production to learn an actual position and/or orientation of the at least one of the features as part of performing the production task; and
executing the second program instructions online during production to learn a position and/or orientation of at least another of the features based on the learned position and/or orientation of the at least one of the features and on the geometric relationship.

14. The method of claim 13, further including the steps of:
executing the first program instructions to direct the robot to perform a production task on the at least another of the features using the learned position and/or orientation of the at least another of the features; and
executing the second program instructions online during production to determine whether the actual position and/or orientation of the at least one of the features is different than the expected position and/or orientation of the at least one of the features,
wherein the executing of the second program instructions online during production to learn the actual position and/or an orientation of the at least another of the features is performed in response to determining that the actual position and/or orientation of the at least one of the features is different than the expected position and/or orientation of the at least one of the features.

15. The method of claim 14, wherein the at least one of the features is at least two of the features of the plurality of features, and wherein the at least another of the features is at least a third feature of the plurality of features.

16. The method of claim 1, wherein the step of modifying comprises the second program instructions modifying the first program instructions to enable human-robot interactive tasks.

17. The method of claim 1, wherein the step of modifying comprises the second program instructions modifying the first program instructions to avoid a collision.

18. The method of claim 1, wherein the step of modifying comprises the second program instructions modifying the first program instructions to direct the robot to hand over a component to a human worker or a part feeder.

19. The method of claim 1, wherein the step of modifying comprises the second program instructions modifying the first program instructions to direct the robot to receive a component from a human worker or a part feeder.

* * * * *